(12) United States Patent
Ohga

(10) Patent No.: US 7,586,657 B2
(45) Date of Patent: Sep. 8, 2009

(54) COLOR PROCESSING METHOD

(75) Inventor: Manabu Ohga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

(21) Appl. No.: 11/578,157

(22) PCT Filed: Feb. 14, 2006

(86) PCT No.: PCT/JP2006/302905

§ 371 (c)(1),
(2), (4) Date: Oct. 11, 2006

(87) PCT Pub. No.: WO2006/088169

PCT Pub. Date: Aug. 24, 2006

(65) Prior Publication Data

US 2007/0236759 A1    Oct. 11, 2007

(30) Foreign Application Priority Data

Feb. 16, 2005  (JP) ............................. 2005-039290

(51) Int. Cl.
*G03F 3/08* (2006.01)
*G06F 3/12* (2006.01)
*G06K 9/00* (2006.01)
*G03G 15/01* (2006.01)

(52) U.S. Cl. .................. 358/518; 358/1.9; 358/519; 358/520; 358/1.13; 382/162; 382/167; 347/115; 347/131

(58) Field of Classification Search ................. 358/520, 358/518, 1.13, 519, 1.9; 382/162, 167; 347/131, 347/115
See application file for complete search history.

(56) References Cited

U.S. PATENT DOCUMENTS

| 6,377,366 B1 * | 4/2002 | Usami ................... 358/520 |
| 6,816,179 B2 * | 11/2004 | Hanyu ................... 347/131 |
| 2003/0133138 A1 | 7/2003 | Namikata ................ 358/1.9 |

FOREIGN PATENT DOCUMENTS

| JP | 2003-87590 | 3/2003 |
| JP | 2003-125223 | 4/2003 |
| JP | 2004-228919 | 8/2004 |
| JP | 2004-228921 | 8/2004 |

* cited by examiner

*Primary Examiner*—Edward L Coles
*Assistant Examiner*—Charlotte M Baker
(74) *Attorney, Agent, or Firm*—Fitzpatrick, Cella, Harper & Scinto

(57) ABSTRACT

To generate conversion data enabling to appropriately control a colorant amount, a profile for storing correspondence between device color data and a colorimetry value and control information for controlling a colorant amount is acquired, and inverse conversion data for converting device independent data into device dependent data is generated based on the correspondence between the device color data and the colorimetry value and the control information for controlling the colorant amount.

5 Claims, 7 Drawing Sheets

FIG. 3

| SETTING OF TOTAL AREA COVERAGE | ☒ |

PRESET

MEDIA TYPE:
▼ ISO GLOSS-COATED
ISO MATT-COATED
OTHER···

HALFTONING:
▼ DITHER
ERROR DIFFUSION
OTHER···

CUSTOM SETTING

TOTAL AREA COVERAGE:
AREA COVERAGE OF PRIMARY COLOR: 100 %
AREA COVERAGE OF SECONDARY COLOR: 200 %
AREA COVERAGE OF QUARTIC COLOR: 400 %

COLOR PROCESSING METHOD

TECHNICAL FIELD

The present invention relates to a method of executing a process using the relation between device color data and a colorimetry value and control information for controlling a colorant amount.

BACKGROUND ART

FIG. 1 is a schematic diagram showing general color matching between different devices.

In FIG. 1, input image data (RGB (red, green and blue) data or CMYK (cyan, magenta, yellow and black) data) represented in a device dependent color space is converted into XYZ data represented in a device independent color space, by using an input profile 11. Since the color outside the color gamut of an output device cannot be reproduced by the relevant output device, gamut mapping is executed to the XYZ data so that all the colors can be held within the color gamut of the relevant output device. Then, the XYZ data subjected to the gamut mapping is converted into the CMYK data represented in the device dependent color space (that is, the color space dependent on the output device). Here, numeral 12 denotes an output profile.

In the general color matching, a reference white point and an environment light are fixed. For example, in the profile defined by the ICC (International Color Consortium), the PCS (Profile Connection Space) for connecting the profile is defined as the XYZ value and the Lab value based on D50.

When an identical sample (for example, an image) is observed under different light sources, the XYZ values for the observed sample are of course different with respect to the respective light sources. For this reason, to estimate the XYZ values under the different light sources, various conversion (transformation) methods such as (1) ratio conversion, (2) von Kries transformation, (3) a prediction equation based on a color appearance model, and the like are proposed.

The ratio conversion is the method of executing the ratio conversion of W2/W1 to convert the XYZ value under the standard white point W1 into the XYZ value under the standard white point W2. If this method is applied to a Lab uniform color space, the Lab value under the standard white point W1 matches with the Lab value under the standard white point W2. For example, if it is assumed that the XYZ value of the sample under the standard white point W1 (Xw1, Yw1, Zw1) is (X1, Y1, Z1) and the XYZ value of the sample under the standard white point W2 (Xw2, Yw2, Zw2) is (X2, Y2, Z2), the following relation (1) is given based on the ratio conversion.

$$X2 = (Xw2/Xw1) \cdot X1$$

$$Y2 = (Yw2/Yw1) \cdot Y1$$

$$Z2 = (Zw2/Zw1) \cdot Z1 \qquad (1)$$

The von Kries transformation is the method of executing the ratio conversion of W2'/W1' on a human's color appearance space PQR to convert the XYZ value under the standard white point W1 into the XYZ value under the standard white point W2. If this method is applied to the Lab uniform color space, the Lab value under the standard white point W1 does not match with the Lab value under the standard white point W2. For example, if it is assumed that the XYZ value of the sample under the standard white point W1 (Xw1, Yw1, Zw1) is (X1, Y1, Z1) and the XYZ value of the sample under the standard white point W2 (Xw2, Yw2, Zw2) is (X2, Y2, Z2), the following relation (2) is given based on the von Kries transformation.

$$\begin{bmatrix} X2 \\ Y2 \\ Z2 \end{bmatrix} = [M^{-1}] \begin{bmatrix} P_2/P_1 & 0 & 0 \\ 0 & Q_2/Q_1 & 0 \\ 0 & 0 & R_2/R_1 \end{bmatrix} [M] \begin{bmatrix} X1 \\ Y1 \\ Z1 \end{bmatrix} \qquad (2)$$

where, $$\begin{bmatrix} P_1 \\ Q_1 \\ R_1 \end{bmatrix} = [M] \begin{bmatrix} X_{w1} \\ Y_{w1} \\ Z_{w1} \end{bmatrix}$$

$$\begin{bmatrix} P_2 \\ Q_2 \\ R_2 \end{bmatrix} = [M] \begin{bmatrix} X_{w2} \\ Y_{w2} \\ Z_{w2} \end{bmatrix}$$

$$[M] = \begin{bmatrix} 0.40024 & 0.70760 & -0.08081 \\ -0.22630 & 1.16532 & 0.04570 \\ 0 & 0 & 0.91822 \end{bmatrix}$$

$$[M^{-1}] = \begin{bmatrix} 1.85995 & -1.12939 & 0.21990 \\ 0.36119 & 0.63881 & 0 \\ 0 & 0 & 1.08906 \end{bmatrix}$$

The prediction equation based on the color appearance model is equivalent to the method of converting the XYZ value under the environment condition VC1 (including the standard white point W1) into the XYZ value under the environment condition VC2 (including the standard white point W2) by using a human's color appearance space QMh (or JCh) such as CIE CAM97s (Commission Internationale de l'Eclairage Color Appearance Model, 1997, Simple) or the like. Here, with respect to the human's color appearance space QMh, the symbol "Q" indicates "brightness", the symbol "M" indicates "colourfulness" and symbol "h" indicates "hue quadrature" or "hue angle". Further, with respect to the human's color appearance space JCh, the symbol "J" indicates "lightness", the symbol "C" indicates "chroma" and the symbol "h" indicates "hue quadrature" or "hue angle". In any case, if this conversion is applied to the Lab uniform color space, as well as the von Kries transformation, the Lab value under the standard white point W1 does not match with the Lab value under the standard white point W2. For example, if it is assumed that the XYZ value of the sample under the standard white point W1 (Xw1, Yw1, Zw1) is (X1, Y1, Z1) and the XYZ value of the sample under the standard white point W2 (Xw2, Yw2, Zw2) is (X2, Y2, Z2), the following conversion is executed according to the color appearance model.

$$(X1, Y1, Z1) \rightarrow [\text{CIE CAM97s forward conversion}] \rightarrow$$
$$(Q, M, H) \text{ or } (J, C, H) \rightarrow [\text{CIE CAM97s inverse}$$
$$\text{conversion}] \rightarrow (X2, Y2, Z2) \qquad (3)$$

FIG. 2 is a conceptual diagram showing the color matching under different observation environments, to be executed by using the color appearance model.

In FIG. 2, the input data (RGB data, CMYK data, gray data, or the like) represented in the device dependent color space is converted into $XYZ_{50}$ data represented in the device independent color space dependent on the input observation condition, by using an input profile 21 dependent on the input observation condition (viewing condition 1 D50). Then, a forward conversion process 22 is executed to the color appearance model based on the input observation condition (viewing condition 1) to convert the $XYZ_{50}$ data into JCh data 23 represented in the color appearance space JCh or QMh data 24 represented in the color appearance space QMh. Subsequently, an inverse conversion process 25 is executed to the color appearance model based on the output observation condition (viewing condition 2) to convert the JCh data 23 or the QMh data 24 into $XYZ_{65}$ data. Further, the acquired $XYZ_{65}$ data is converted into the CMYK data represented in the color space dependent on the output observation condition and the device by using an output profile 26 dependent on the output observation condition (viewing condition 2).

As shown in FIGS. 1 and 2, the color matching between the different devices can be achieved through the device independent XYZ value (or Lab value).

However, it is necessary to consider the following problems in case of converting the XYZ value to the CMYK value. That is, (1) since there are the plural combinations of the CMY value and the K value in regard to one XYZ value, it is necessary to fix the characteristic of black printer (K printer) generation to acquire one solution. Further, (2) since there is a case where the total area coverage in the ink or the toner is not controlled in regard to a CMYK patch print-output from a CMYK device, it is necessary to set the total area coverage according to each medium and print quality in case of converting the XYZ value to the CMYK value.

Here, it is assumed that, in the total area coverage, the outputtable upper limit value is set in the combination of the respective inks and toners. For example, the area coverage of primary color (K), the area coverage of secondary color (C+M, M+Y, Y+C), and the area coverage of quartic color (C+M+Y+K) are set. Incidentally, it should be noted that the primary color is the color reproduced by using one kind of colorant, and the secondary color is the color reproduced by using two kinds of colorants. That is, an N-degree color is the color represented by using N kinds of colorants.

In the profile (that is, the XYZ value under the observing condition in each device is used instead of the PCS D50) which is used in consideration of the conventional ICC profile and the observation condition, the conversion table such as a 3D LUT (three-dimensional lookup table) or the like stored in case of converting the XYZ value to the CMYK value is used, whereby the black printer generation characteristic and the total area coverage of toner or ink have to be set at the time of generating the profile. Thus, it is necessary to generate the profile, install the generated profile, designate the installed profile and execute the color matching every time the setting of the black printer generation characteristic and the total area coverage is changed.

Moreover, in the profile which is used in consideration of the conventional ICC profile and the observation condition, the gamut mapping is included in the profile conversion. For this reason, when the profile is generated, the characteristic of the other profile becomes undefined. More specifically, when the output profile is generated, the characteristic of the input profile becomes undefined, and vice versa. Thus, it is impossible to execute the gamut mapping by using both the input-side color gamut and the output-side color gamut. In other words, it is impossible to execute the gamut mapping which is most appropriate for the combination of the input-side color gamut and the output-side color gamut (that is, the target of the color matching).

DISCLOSURE OF THE INVENTION

According to one aspect of the present invention, it is characterized by acquiring a profile for storing correspondence between device color data and a colorimetry value and control information for controlling a colorant amount, and generating first conversion data for converting device independent data into device dependent data based on the correspondence between the device color data and the colorimetry value and the control information for controlling the colorant amount.

According to another aspect of the present invention, it is characterized by comprising: an acquisition step of acquiring correspondence between device color data and a colorimetry value and control information for controlling a colorant amount; an inverse conversion data generation step of generating first conversion data for converting device independent color data into device dependent color data, from the correspondence between the device color data and the colorimetry value and the control information for controlling the colorant amount; a first color gamut calculation step of acquiring a color gamut when the colorant amount at a time of image output is limited by the control information, based on the correspondence between the device color data and the colorimetry value and the control information for controlling the colorant amount; a forward conversion data generation step of generating second conversion data for converting the device dependent color data into the device independent color data, from the correspondence between the device color data and the colorimetry value; and a second color gamut calculation step of acquiring the color gamut based on the colorimetry value, irrespective of the control of the colorant amount by the control information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the embodiments of the invention and, together with the description, serve to explain the principles of the invention.

FIG. 3 is a diagram showing an example of the user interface of the profiler for setting total area coverage;

BEST MODE FOR CARRYING OUT THE INVENTION

The preferred embodiments of the present invention will now be described in detail with reference to the accompanying drawings.

FIRST EMBODIMENT (Color Matching Using Device Model and Gamut Mapping on Human's Color Appearance Space)

Figure 1:
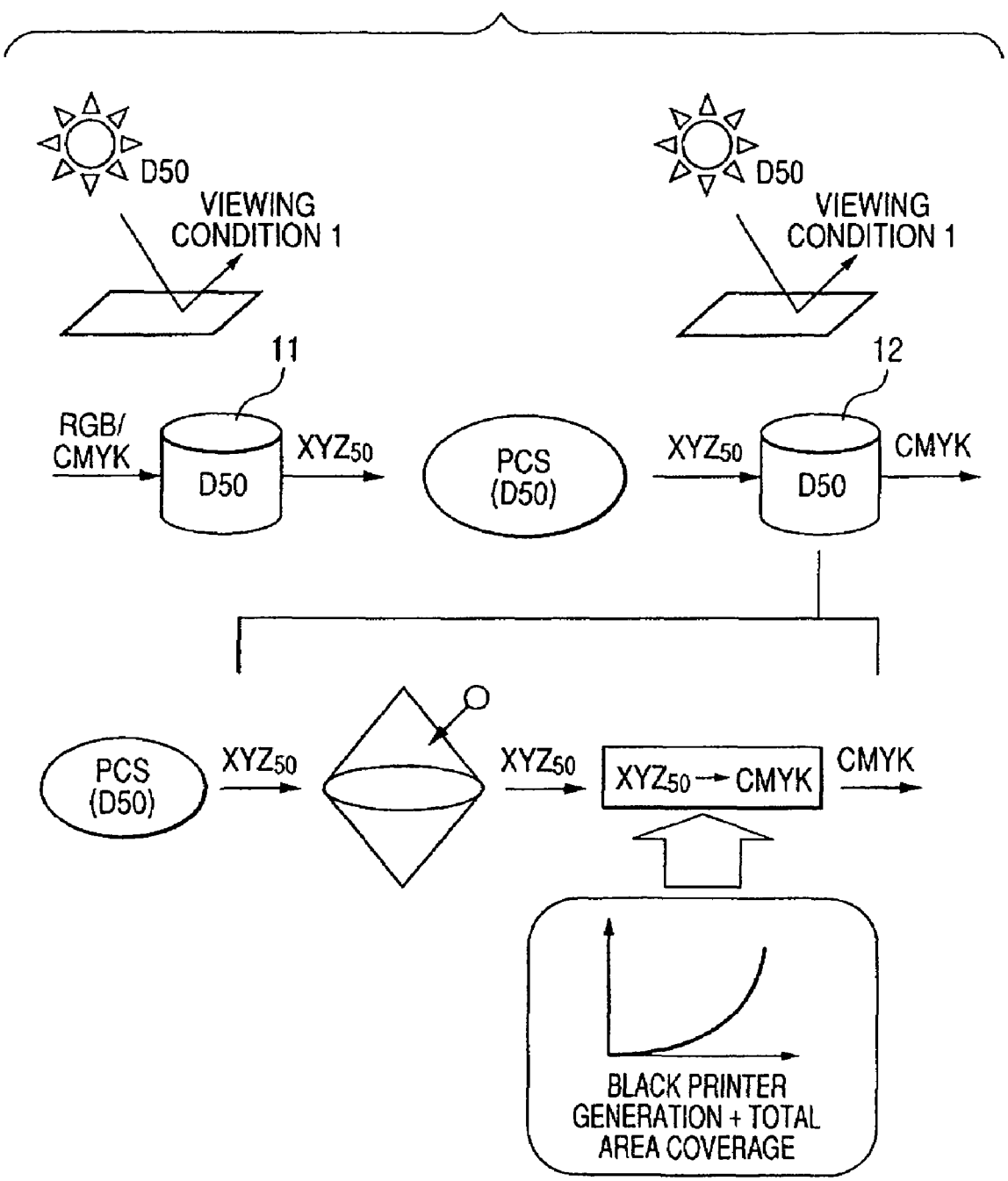
FIG. 1 is the conceptual diagram showing the general color matching between different devices.
Figure 2:
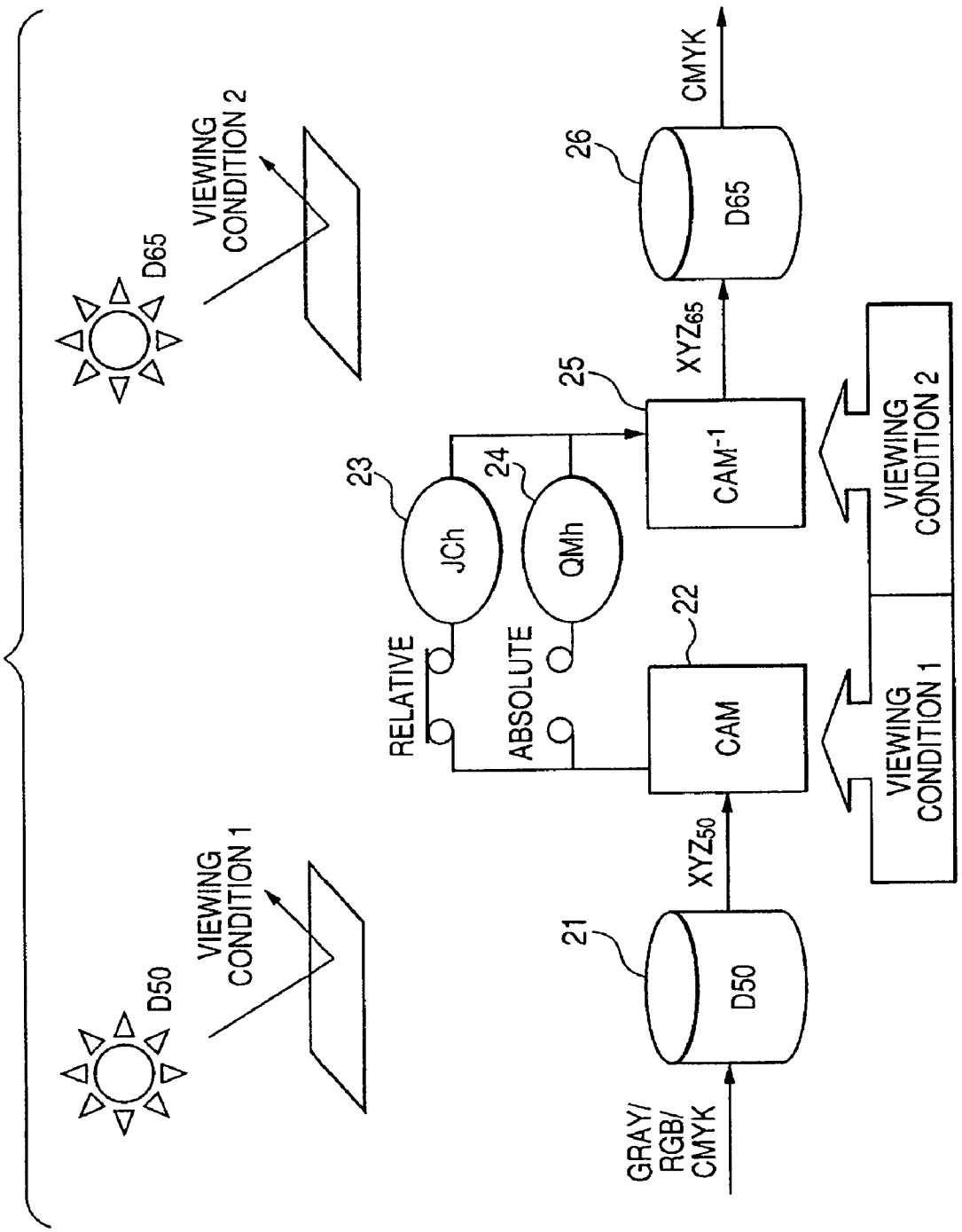
FIG. 2 is the conceptual diagram showing the color matching to be executed by using the color appearance model.
Figure 4:
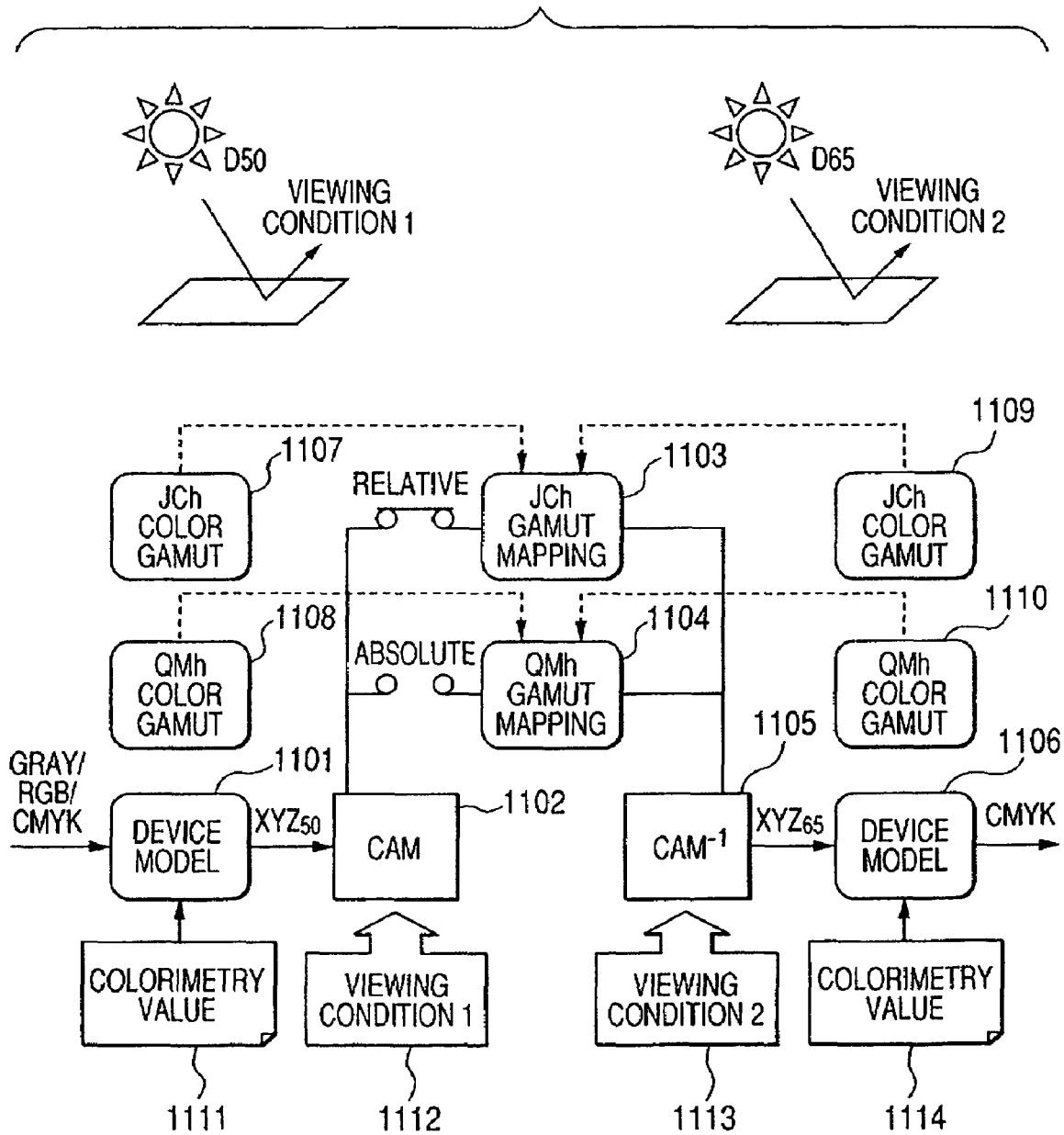
FIG. 4 is a conceptual diagram showing the color matching according to the first embodiment.

FIG. 4 is a conceptual diagram showing the color matching which uses the gamut mapping on a human's color appearance space.

First, an inputs-side device model 1101 and an output-side device model 1106 are generated respectively by using a colorimetry value 1111 and a colorimetry value 1114. Here, in the device model, there are forward conversion (corresponding to the process of AToB1Tag of the ICC profile) and inverse conversion (corresponding to the process of BToA1Tag of the ICC profile). Further, it should be noted that device characterization implies the process of generating the conversion data for executing the forward conversion (that is, the conversion from device dependent data to device independent data) and the conversion data for executing the inverse conversion (that is, the conversion from device independent data to device dependent data).

In a case of generating the forward conversion data, the colorimetry value file (1111 or 1114) in which the correspondence between the device color and the colorimetry value is described is read, and the multi-dimensional LUT or the conversion equivalent for converting the device color into the XYZ value is generated. On the other hand, in a case of generating the inverse conversion data, for example, the polynomial parameter is optimized by inverse referring of the forward conversion multi-dimensional LUT or the regression analysis method by using the result of the forward conversion, whereby the multi-dimensional LUT or the conversion equivalent for converting the XYZ value into the device color is generated.

Here, it should be noted that the colorimetry value and the device independent color space need not be limited to the XYZ value. That is, the colorimetry value and the device independent color space may be a Lab color space, a Luv color space or the like.

Next, a color gamut 1107 (or 1108) of the input-side device and a color gamut 1109 (or 1110) of the output-side device on the human's color appearance space are acquired. Here, in a relative mode, the color appearance space JCh is selected as the human's color appearance space. On the other hand, in an absolute mode, the color appearance space QMh is selected as the human's color appearance space.

Incidentally, the color gamut 1107 (or 1108) of the input-side device can be acquired by applying the forward conversion of the color appearance model to the XYZ value of the whole input-side device acquired from the colorimetry value of the colorimetry value file 1111 and the result of the forward conversion of the device model 1101, and forming the three-dimensional convex hull of the acquired JCh (or QMh) value. Here, it should be noted that the color gamut is the three-dimensional solid containing the acquired JCh (or QMh) value.

Further, the color gamut 1109 (or 1114) of the output-side device can be acquired by applying the forward conversion of the color appearance model to the XYZ value of the whole output-side device acquired from the colorimetry value of the colorimetry value file 1114 and the result of the forward conversion of the device model 1106, and forming the three-dimensional convex hull of the acquired JCh (or QMh) value.

Here, an input-side observation condition 1112 is set to the input-side color appearance model, and an output-side observation condition 1113 is set to the output-side color appearance model. Incidentally, it should be noted that the color appearance model is not limited to CIE CAM02, CIE CAM97s or the like. That is, it is possible to use another color appearance model if it can predict human's color appearance parameters J, C, Q, M, h and H.

In any case, the color matching is executed based on the input-side device model and color gamut and the output-side device model and color gamut, as generated above.

The color conversion from the input-side device color into the output-side device color can be executed in consideration of the gamut mapping on the human's color appearance space JCh, as follows.

First, the XYZ value is acquired by applying the forward conversion of the input-side device model 1101 to the input color. Then, the JCh value is acquired by applying the forward conversion of a color appearance model 1102 based on the input-side observation condition 1112, gamut mapping 1103 is executed based on the color gamut 1107 of the input-side device and the color gamut 1109 of the output-side device, and the XYZ value is acquired by applying the inverse conversion of a color appearance model 1105 based on the output-side observation condition 1113 to the JCh value after the gamut mapping. Subsequently, the output color is acquired by applying the inverse conversion of the output-side device model 1106.

As well, the color conversion from the input-side device color into the output-side device color can be executed in consideration of the gamut mapping on the human's color appearance space QMh, by using the color gamut 1108 of the input-side device, the color gamut 1110 of the output-side device, gamut mapping 1104, and the like.

According to the color matching shown in FIG. 4, it is possible to execute the optimum gamut mapping for the combination of the color gamut of the input-side device and the color gamut of the output-side device.

(Color Matching Using Output-Side Device Model of CMYK Printer 59)

Figure 5:
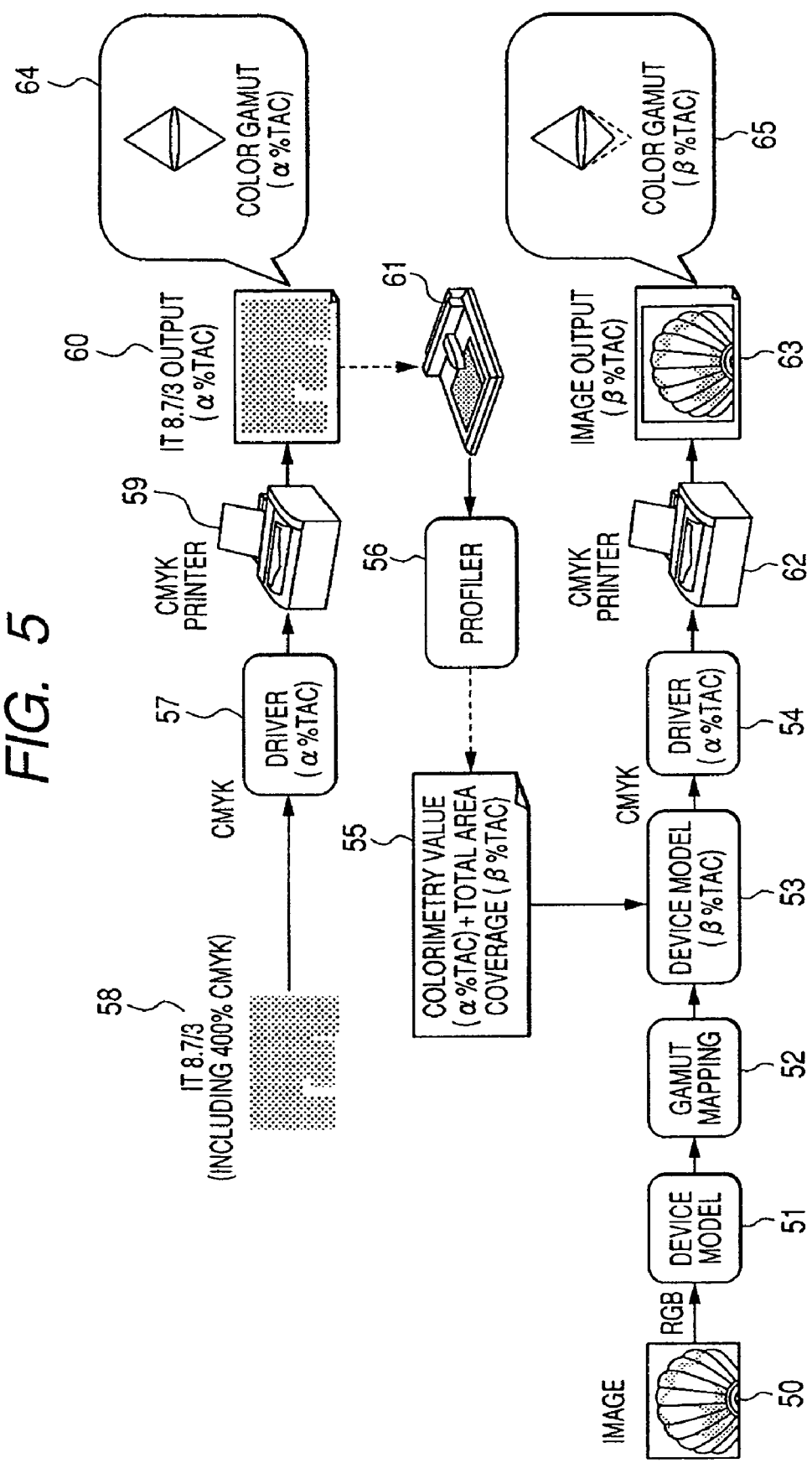
FIG. 5 is a diagram for explaining the color matching process to be executed in case of using the CMYK printer as the output device.

FIG. 5 is a diagram for explaining, in the color matching according to the present embodiment, the color matching process to be executed in case of using the CMYK printer 59 as the output device.

<Generation of Output-Side Device Model 53 in Consideration of Total Area Coverage and Black Printer Generation Characteristic>

Generation of Inverse Conversion Data

Hereinafter, the process to be executed by the output-side device model 53 in consideration of the total area coverage and the black printer generation characteristic will be explained.

First, to analyze the device characteristic of the CMYK printer 59, CMYK patch data 58 is processed based on the setting of a printer driver 57, and the processed data is print-output from the CMYK printer 59 under the condition of TAC of α %, thereby acquiring a CMYK patch 60 printed on the medium. Here, the CMYK patch 60 has a color gamut 64 of TAC of α %. For example, CMYK patch (data) 58 implies the CMYK color target such as IT8.7/3, IT8.7/4, ECI or the like which includes the total area coverage 400%.

Moreover, it should be noted that the total area coverage implies the total value of the respectively used colorants, and the maximum recordable amount by each colorant is set to 100%. In this connection, for example, if the CMYK printer executes the printing by using the maximum amounts of the respective colorants C (cyan), M (magenta), Y (yellow) and K (black), the total area coverage is 400%.

If the image is output by using the colorants of which the amount exceeds the appropriate total area coverage, it is impossible to appropriately fix the colorants to the recording medium. For example, the medium onto which the image has been output becomes moist and crinkles, and the colorants peel off from the medium onto which the image has been output. Therefore, to prevent such phenomena and acquire a high-quality output image, it is necessary to appropriately control the colorant amount.

There is a case where the CMYK patch 60 printed on the recording medium is limited by the total area coverage setting or the like of the printer driver 57 or the printer controller. For example, if the total area coverage (TAC) setting of the printer driver 57 is $\alpha$ % ($\alpha$<400) for the quartic color, the total area coverage 400% of CMYK on the CMYK patch 58 is limited to the total area coverage $\alpha$ % of CMYK. Here, it should be noted that the total area coverage setting of the printer driver 57 or the printer controller is different with respect to each product. Moreover, there is the product which can turn on/off the total area coverage limiting function. Therefore, according to the relevant product, if the total area coverage limiting function is off, the colorants (CMYK) of the total area coverage 400% are directly printed on the medium.

Subsequently, the CMYK patch 60 printed on the medium is subjected to a colorimetric process by a colorimeter 61 controlled from a profiler 56, and the acquired colorimetry value associated with the device color (CMYK) is stored as a profile 55. At the same time, the black printer generation characteristic and the total area coverage setting are stored in the profile 55 by the profiler 56.

FIG. 3 is a diagram showing an example of the user interface of the profiler for setting the total area coverage. Here, it should be noted that the optimum value of the total area coverage is different with respect to each medium type and print quality such as halftoning, print speed and the like. Therefore, there are two methods for the user to set the total area coverage, one to set the total area coverage according to the medium type and the print quality, and the other to set the total area coverage by directly inputting the area coverage of primary color (K), the area coverage of secondary color (C+M, M+Y, Y+C) and the area coverage of quartic color (C+M+Y+K) so as to cope with an unknown medium and/or unknown print quality. In the present embodiment, to simplification of explanation, it is assumed that the total area coverage set for the quartic color by the profiler 56 is $\beta$ % ($\beta$<$\alpha$).

Moreover, with respect to the black printer generation characteristic, there are provided two cases, one of setting the preset values such as hard tone black printer generation, medium tone black printer generation, soft tone black printer generation, and the like, and the other of directly inputting the sampling value of a black printer curve.

If the user selects as the output-side profile the profile 55 in which the colorimetry value, the black printer generation characteristic and the area coverage are stored, the output-side device model 53 dynamically executes the following process.

Incidentally, if the area coverage and the black printer generation characteristic are stored in addition to the colorimetry value in the profile, it is unnecessary to set the area coverage and the black printer generation characteristic in case of generating the conversion data by using the device model.

Step 1

Uniformly sampled RGB→(complementary color conversion)→CMY→(total area coverage limitation)
→CMYK→(black printer characteristic)
→C'M'Y'K'

First, the RGB color space is internally defined as the intermediate color space, and, for example, the conversion from the uniformly 17×17×17 sampled RGB value into the CMYK value is thought. More specifically, to convert the RGB value into the CMYK value, the RGB value is converted into the CMY value by the complementary color conversion (C=1−R, M=1−G, Y=1−B). Then, to convert the CMY value into the CMYK value, the 3D LUT having the eight lattice points of W(0, 0, 0), R(0, 1, 1), Y(0, 0, 1), G(1, 0, 1), C(1, 0, 0), B(1, 1, 0), M(0, 1, 0) and Bk (1, 1, 1) is defined for the CMY input so as to be able to consider the total area coverage (TAC).

Then, for example, the values such as W(0, 0, 0, 0), R(0, TAC2/2, TAC2/2, 0), Y(0, 0, 1, 0), G(TAC2/2, 0, TAC2, 0), C(1, 0, 0, 0), B(TAC2/2, TAC2/2, 0, 0), M(0, 1, 0, 0) and Bk((TAC4−TAC1)/3, (TAC4−TAC1)/3, (TAC4−TAC1)/3, TAC1) are set for the respective lattice points so as to be able to output the CMYK value according to the total area coverage setting (area coverage of primary color TAC1, area coverage of secondary color TAC2, area coverage of quartic color TAC4). Subsequently, the linear CMYK value to which the total area coverage limitation is applied according to the CMY value is acquired by linear interpolation.

Next, the black printer output is acquired from the acquired K value (linear K) by using the black printer curve of the black printer generation characteristic (converted into the black printer curve in case of the preset value), and other CMY output is corrected according to the black printer output.

Step 2

C'M'Y'K'→XYZ→RGB→XYZ

Next, the XYZ value is acquired for the C'M'Y'K' output corrected based on the total area coverage and the black printer generation characteristic, by interpolating the colorimetry value associated with the device color CMYK in the profile, whereby the RGB→XYZ conversion data can be generated.

Step 3

RGB→XYZ→XYZ→RGB→XYZ→CMYK

The XYZ value can be acquired for the uniformly 17×17×17 sampled RGB value in the step 2. Then, the conversion from the XYZ value into the RGB value is acquired by, for example, the optimization of the polynomial parameter by the inverse referring of the 3D LUT conversion from the RGB value into the XYZ or the regression analysis method. Subsequently, the conversion from the RGB value acquired in the step 1 into the CMYK output corrected based on the total area coverage and the black printer generation characteristic is applied to the conversion from the XYZ value into the RGB value, whereby the conversion from the XYZ value into the CMYK value is acquired finally.

By the above processes, the XYZ→CMYK conversion data can be acquired in consideration of the total area coverage and the black printer generation characteristic.

Generation of Forward Conversion Data

On the other hand, with respect to the forward conversion data of the CMYK printer, it is unnecessary to comply with the total area coverage setting $\beta$ % in the profile, and the conversion data corresponding to the total area coverage $\alpha$ % according to the print output of the CMYK patch is generated.

This is because, since the total area coverage of the print output of the CMYK patch 60 is $\alpha$ % which is larger than the total area coverage $\beta$ %, if the forward conversion data according to the total area coverage $\alpha$ % is used, the XYZ value for the CMYK value can be acquired with respect to the CMYK data of which the total area coverage is limited to $\beta$ %, by interpolating the colorimetry value associated with the device color CMYK in the profile.

In any case, in generating the forward conversion data, the multi-dimensional LUT or the conversion equipment for converting the device color into the XYZ value is generated based on the correspondence between the device color and the colorimetry value stored in the profile 55, without any process according to the total area coverage.

<Generation of Color Gamut of CMYK Device Model>

Hereinafter, the method of generating the color gamut of the CMYK device model based on the total area coverage setting will be explained. Even where the total area coverage setting of the printer driver is α%, if the total area coverage is set to β % (<α %) in the profile in case of the output-side device model of the CMYK printer, it is necessary to generate the color gamut of the total area coverage of β % as the color gamut of the output-side device. This is because the gamut which can be actually reproduced by the CMYK printer is the gamut of which the total area coverage is limited to β %.

The color gamut of the total area coverage β % can be generated by using the RGB→XYZ conversion data corresponding to the total area coverage β % generated in the step 2 of the generation process of the output-side device model 53 in consideration of the total area coverage and the black printer generation characteristic.

The respective sampling values for the whole intermediate RGB color space are converted into the XYZ values by using the RGB→XYZ conversion data. Then, each XYZ value is converted into the JCh value by applying the forward conversion of the color appearance model based on the output-side observation condition, and the three-dimensional convex hull is formed based on the acquired JCh value group. It should be noted that the formed three-dimensional convex hull is the color gamut of the total area coverage β %. According to the present embodiment, it is possible to acquire the color gamut according to the actual total area coverage β % irrespective of the total area coverage α % to which the colorimetry value is dependent. That is, it is possible to acquire the color gamut by which the color range capable of being actually reproduced by a CMYK printer 62 is represented with a high degree of accuracy.

To execute the color gamut mapping with a high degree of accuracy, it is important for the output-side CMYK device model to appropriately acquire the color gamut capable of being reproduced by the CMYK printer 62. Therefore, it is important to generate the color gamut of the device model based on the total area coverage.

<Color Matching Using CMYK Device Model and Gamut Mapping on Human's Color Appearance Space>

Hereinafter, the process procedure to be executed in case of executing the color matching by using the inverse conversion data of the CMYK printer and the color gamut of the CMYK printer acquired by the above processes will be explained.

The RGB value is converted into the XYZ value by applying an input-side device model 51 to an input image 50, and the XYZ value is further converted into the JCh value by using the forward conversion of the color appearance model based on the input-side observation condition. Next, gamut mapping 52 is executed by using the color gamut of the input-side device and the color gamut of the output-side device (color gamut for total area coverage β %). Then, the JCh value subjected to the gamut mapping is converted into the XYZ value by using the inverse conversion of the color appearance model based on the output-side observation condition. Subsequently, the acquired XYZ value is converted into the CMYK value corrected based on the total area coverage β % and the black printer generation characteristic, by applying the output-side device model 53 (inverse conversion data).

It is possible by the above to convert the input image 50 into a CMYK image.

In a case where the CMYK image is print-output by using a printer driver 54 (=57) same as the system by which the CMYK patch 58 is print-output and the CMYK printer 62 (=59), since the total area coverage α % of the printer driver 54 is larger than the total area coverage β % set in the output-side device model, it is possible to resultingly acquire a CMYK print output 63 corresponding to the total area coverage β %. That is, although the total area coverage of the CMYK print output 60 for the CMYK patch 58 is α %, it is possible to limit the total area coverage β % of the CMYK print output 63 for the input image 50. Here, a color gamut 65 of the total area coverage β % is smaller than the color gamut of the total area coverage α %.

Moreover, it is possible to cause the color gamut of the output-side device used in the gamut mapping 52 and the output-side device model 53 (inverse conversion data) to correspond to the total area coverage (β %) at the time of print output. Consequently, it is possible to achieve the highly accurate gamut mapping and the highly accurate CMYK conversion, and it is thus possible to acquire the high-quality print output 63.

(Color Matching Using CMYK Printer as Input Device and Output Device)

Figure 7:
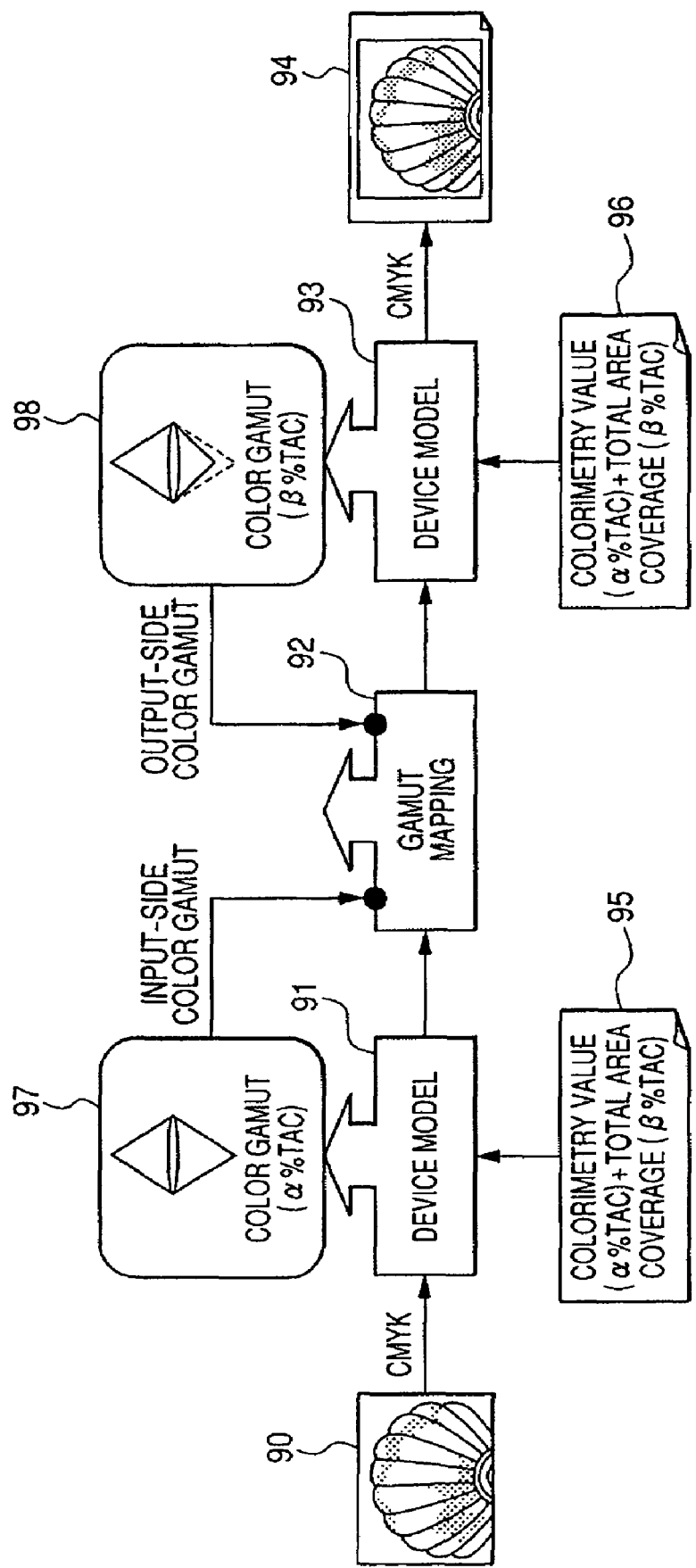
FIG. 7 is a diagram for explaining the color matching process to be executed in case of using the CMYK printers as the input device and the output device.

FIG. 7 is a conceptual diagram for explaining, in the color matching according to the present embodiment, the color matching process to be executed in case of using the CMYK printer as each of the input device and the output device. According to the color matching shown in FIG. 7, the print image when input image data 90 is printed by the input device can be simulated by the output device.

Here, it should be noted that the process shown in FIG. 7 is different from that shown in FIG. 5 in the points concerning the method of acquiring an input-side color gamut 97 and the process of an input-side device model 91. In other words, since the contents of an output-side color gamut 98, an output-side device model 93 and an output-side profile 96 are the same as those shown in FIG. 5, the explanation thereof will be omitted.

<Generation of Input-Side Device Model 91 in Consideration of Total Area Coverage and Black Printer Generation Characteristic>

As well as the case shown in FIG. 5, the forward conversion data and the inverse conversion data are generated by using a profile 95 corresponding to the input device.

Then, in the input-side device model, the conversion process is executed by using the forward conversion data. With respect to the forward conversion data, it is unnecessary to comply with the total area coverage setting 1% in the profile. Namely, the forward conversion data is generated in correspondence with the total area coverage α % according to the print output of the CMYK patch.

<Generation of Color Gamut of Input Device Model of CMYK Printer>

If the CMYK printer is the input-side device model, the color gamut of the input-side device need not comply with the total area coverage setting β % in the profile. Namely, the color gamut according to the total area coverage α % when the CMYK patch is print-output is generated.

This is because the input image data is not necessarily limited to the total area coverage β %. For example, a case where the conversion process is executed based on a different total area coverage setting value, a case where the input image data is changed based on the adjustment result of a color editing process, and the like correspond.

In the color gamut according to the total area coverage α % when the CMYK patch is print-output, the colorimetry value in the profile 95 is converted into the JCh value by using the forward conversion of the color appearance model based on the input-side observation condition, and the three-dimensional convex hull is formed for the acquired JCh value group.

<Color Matching>

Then, the color matching is executed based on the input-side device model (forward conversion data) 91, the input-side color gamut 97, the output-side device model (inverse conversion data) 93 and the output-side color gamut 98 which are acquired in the above processes. Here, gamut mapping 92 is executed by using the input-side color gamut 97 and the output-side color gamut 98. Incidentally, numeral 94 denotes an image output.

According to the present embodiment, since the input-side device model and the input-side color gamut are not limited to the total area coverage β %, it is possible to execute the conversion process even if the color data exceeding the total area coverage α % is included in the input image data. Here, even if the input-side device model does not correspond to the data of which the total area coverage is equal to or larger than β %, the input-side device model cannot appropriately convert the color data of which the total area coverage exceeds β %, whereby an error or miscolored printing occurs.

Further, the output-side device model (inverse conversion data) 93 and the output-side color gamut 98 are based on the total area coverage β %, whereby it is possible to achieve the highly accurate process as well as the case shown in FIG. 5.

In any case, according to the color matching shown in FIG. 7, it is possible to execute the color matching of the simulate with a high degree of accuracy.

MODIFIED EMBODIMENTS

Figure 6:
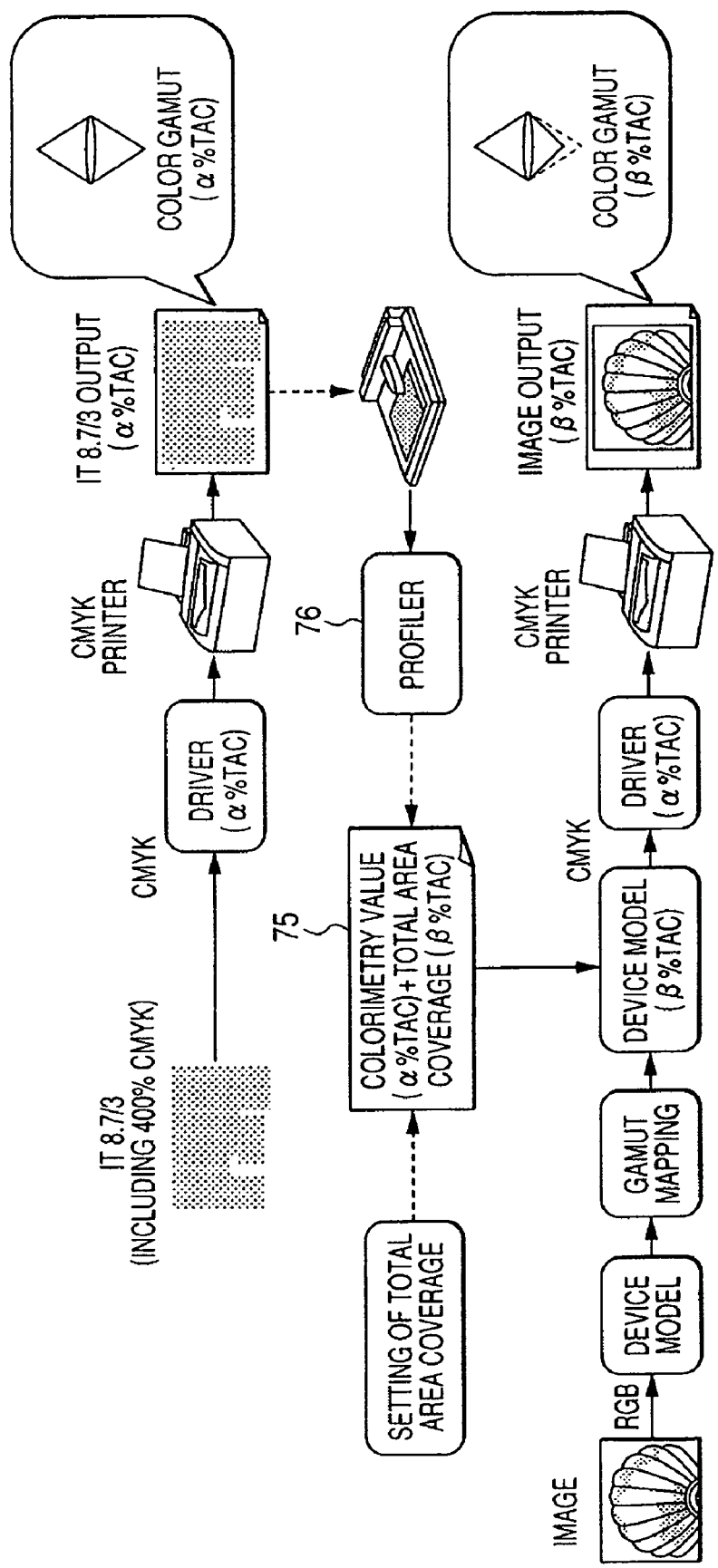
FIG. 6 is a diagram for explaining the color matching process to be executed in case of using the CMYK printers as the input device and the output device.

In the first embodiment, the total area coverage is set by using the user interface of the profiler. However, it is possible to set the total area coverage and the black printer generation characteristic in the profile after generating the profile. FIG. 6 shows an example of setting the black printer generation characteristic and the total area coverage by using a control panel. In FIG. 6, the basic operation that a profiler 76 stores as a profile 75 the colorimetry value associated with the device color CMYK, the black printer generation characteristic and the setting value of the total area coverage is the same as that shown in FIG. 5. However, in FIG. 6, it is possible to change the black printer generation characteristic and the setting value of the total area coverage through the control panel or the like, after generating the profile. Consequently, the user can again set only the black printer generation characteristic and the total area coverage without again executing the colorimetric operation.

Further, in the first embodiment, the colorimetry value is stored in the profile as it is. However, the result of the correction process such as smoothing correction, white point correction, black point correction or the like may be stored as the colorimetry value.

Furthermore, in the first embodiment, the CMYK printer is used. However, the present invention can be attained even where an image output device such as an RGB printer, a CMYKRGB printer or the like for executing the image output by using the combinations of other colorants (inks, toners, etc.) is used.

Moreover, as the total area coverage control parameter to be stored in the profile, the area coverage for each colorant or the area coverage of secondary color may be used instead.

Moreover, the color matching process which uses the profile may be executed inside a driver or a controller.

The present invention includes a case of supplying the program codes of software to achieve the functions of the above embodiment to the computer in a system or an apparatus connected to various devices so as to operate these devices to achieve the functions of the above embodiment, and causing these devices to operate according to the program codes stored in the computer (or CPU, MPU) in the system or the apparatus.

In this case, the program codes themselves achieve the functions of the above embodiment. Therefore, the program codes themselves and the means for supplying these program codes to the computer (for example, a storage medium for storing these program codes) constitute the present invention.

As the storage medium for storing the program codes, for example, a floppy™ disk, a hard disk, an optical disk, a magnetooptical disk, a CD-ROM, a magnetic tape, a nonvolatile memory card, a ROM or the like can be used.

Further, it is needless to say that the present invention includes not only a case where the functions of the above embodiment are achieved by executing the supplied program codes with the computer, but also a case where an OS (operating system) or the like running on the computer or the OS cooperating with another application software execute the program codes to achieve the functions of the above embodiment.

Furthermore, it is needless to say that the present invention also includes a case where, after the supplied program codes are written into the memory provided on the function expansion board inserted in the computer or provided in the function expansion unit connected to the computer, the CPU or the like provided in the function expansion board or the function expansion unit executes a part or all of the actual processes on the basis of the instructions of the program codes, and thus the functions of the above embodiment are achieved by such the processes.

As many apparently widely different embodiments of the present invention can be made without departing from the spirit and scope thereof, it is to be understood that the present invention is not limited to the specific embodiments thereof expect as defined in the appended claims.

This application claims priority from Japanese Patent Application No. 2005-039290 filed Feb. 16, 2005, which is hereby incorporated by reference herein.

The invention claimed is:

1. A color processing method comprising the steps of:

acquiring control information for limiting an amount of a colorant, and a correspondence between device color data and a colorimetry value;

setting a total area coverage limiting process based on the control information for limiting the amount of the colorant;

performing a conversion process, based on the total area coverage limiting process and the correspondence between the device color data and the colorimetry value, on a sampling value;

setting a color gamut by using the sampling value subjected to the conversion process;

generating inverse conversion data for converting device independent data into the device color data, by using the total area coverage limiting process and the correspondence between the device color data and the colorimetry value;

mapping an input color data in the set color gamut, and converting the mapped color data into the device color data by using the generated inverse conversion data; and generating forward conversion data for converting the device color data into the device independent data by using the correspondence between the device color data and the colorimetry value, without using the control information.

2. A color processing method according to claim 1, further comprising the step of converting, in regard to the input color data, color data dependent on an input device into device independent color data by using the forward conversion data of the input device, wherein a color gamut of the input device and the set color gamut are used in the mapping.

3. A color processing method according to claim 1, wherein the control information includes first control information for limiting an area coverage of a primary color of the colorant and second control information for limiting an area coverage of a secondary color of the colorant.

4. A computer-readable medium encoding a program which causes a computer to execute a color processing method comprising the steps of:

acquiring control information for limiting an amount of a colorant, and a correspondence between device color data and a colorimetry value;

setting a total area coverage limiting process based on the control information for limiting the amount of the colorant;

performing a conversion process, based on the total area coverage limiting process and the correspondence between the device color data and the colorimetry value, on a sampling value;

setting a color gamut by using the sampling value subjected to the conversion process;

generating inverse conversion data for converting device independent data into the device color data, by using the total area coverage limiting process and the correspondence between the device color data and the colorimetry value;

mapping an input color data in the set color gamut, and converting the mapped color data into the device color data by using the generated inverse conversion data; and generating forward conversion data for converting the device color data into the device independent data by using the correspondence between the device color data and the colorimetry value, without using the control information.

5. A color processing device comprising:

an acquiring unit adapted to acquire control information for limiting an amount of a colorant, and a correspondence between device color data and a colorimetry value;

a setting unit adapted to set a total area coverage limiting process based on the control information for limiting the amount of the colorant;

a performing unit adapted to perform a conversion process, based on the total area coverage limiting process and the correspondence between the device color data and the colorimetry value, on a sampling value;

a setting unit adapted to set a color gamut by using the sampling value subjected to the conversion process;

a generating inverse conversion unit adapted to generate inverse conversion data for converting device independent data into the device color data, by using the total area coverage limiting process and the correspondence between the device color data and the colorimetry value;

a mapping unit adapted to map an input color data in the set color gamut, and converting the mapped color data into the device color data by using the generated inverse conversion data; and a generating forward conversion unit adapted to generate forward conversion data for converting the device color data into the device independent data by using the correspondence between the device color data and the colorimetry value, without using the control information.

* * * * *